US012625914B2

(12) United States Patent
Cerafogli et al.

(10) Patent No.: US 12,625,914 B2
(45) Date of Patent: May 12, 2026

(54) INTELLIGENT DATA STORAGE FOR EFFICIENT RETRIEVAL BASED ON CONTEXTUAL AWARENESS FOR MOBILE APPLICATIONS

(71) Applicant: Micron Technology, Inc., Boise, ID (US)

(72) Inventors: Chiara Cerafogli, Boise, ID (US); Jonathan S. Parry, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/223,931

(22) Filed: Jul. 19, 2023

(65) Prior Publication Data

US 2024/0045914 A1　Feb. 8, 2024

Related U.S. Application Data

(60) Provisional application No. 63/394,538, filed on Aug. 2, 2022.

(51) Int. Cl.
　*G06F 16/9535* 　(2019.01)
　*G06F 16/9538* 　(2019.01)

(52) U.S. Cl.
　CPC ...... *G06F 16/9535* (2019.01); *G06F 16/9538* (2019.01)

(58) Field of Classification Search
　CPC .......................... G06F 16/9535; G06F 16/9538
　USPC ........................................................... 707/706
　See application file for complete search history.

(56) References Cited

U.S. PATENT DOCUMENTS

| | | | | |
|---|---|---|---|---|
| 2010/0250497 A1* | 9/2010 | Redlich | .................. | G06Q 10/06 |
| | | | | 707/661 |
| 2019/0034340 A1* | 1/2019 | Doshi | ................. | G06F 13/1668 |
| 2022/0035827 A1* | 2/2022 | McCann | ............... | G06F 16/954 |
| 2022/0335538 A1* | 10/2022 | Park | .................... | G06F 16/9535 |
| 2022/0398221 A1* | 12/2022 | Zou | ..................... | G06F 16/1748 |

* cited by examiner

*Primary Examiner* — Giovanna B Colan
(74) *Attorney, Agent, or Firm* — Lowenstein Sandler LLP

(57) ABSTRACT

Processing logic maintains a data item tag hierarchy in view of user context information and identifies, from the data item tag hierarchy, a highest ranked data item tag of a plurality of data item tags associated with a data item, the plurality of data item tags representing a content of the data item. The processing logic further storing the data item on a memory device at a first shared storage location together with one or more additional data items with which the highest ranked data item tag is also associated.

17 Claims, 6 Drawing Sheets

100

120A

160

Network
150

Server 120B

Tag Logic 113

Memory Sub-System
110B

Co-Located Data
Items 180

110A

300

RECEIVE DATA ITEM TO BE STORED <u>305</u>

USE ML MODEL TO IDENTIFY TAGS TO BE ASSOCIATED WITH DATA ITEM <u>310</u>

DOES TAG HIERARCHY ALREADY EXIST? <u>315</u>

NO

STORE DATA ITEM AT ANY LOCATION <u>320</u>

YES

IDENTIFY HIGHEST RANKED TAG ASSOCIATED WITH DATA ITEM IN HIERARCHY <u>325</u>

STORE DATA ITEM WITH OTHER DATA ITEMS ASSOCIATED WITH HIGHEST RANKED TAG <u>330</u>

500

MONITOR USER ACTIVITIES <u>505</u>

GENERATE/UPDATE TAG HIERARCHY IN VIEW OF USER ACTIVITIES <u>510</u>

IS DATA ITEM STORED WITH OTHER DATA ITEMS ASSOCIATED WITH HIGHEST RANKED TAG IN HIERARCHY? <u>515</u>

YES

MAINTAIN DATA ITEM AT CURRENT LOCATION <u>520</u>

NO

STORE DATA ITEM WITH OTHER DATA ITEMS ASSOCIATED WITH HIGHEST RANKED TAG <u>525</u>

INTELLIGENT DATA STORAGE FOR EFFICIENT RETRIEVAL BASED ON CONTEXTUAL AWARENESS FOR MOBILE APPLICATIONS

RELATED APPLICATIONS

This application is a continuation of U.S. Patent Application No. 63/394,538, filed Aug. 2, 2022, the entire contents of which are hereby incorporated by reference herein.

TECHNICAL FIELD

Embodiments of the disclosure relate generally to memory sub-systems, and more specifically, relate to intelligent data storage for efficient retrieval from a memory sub-system based on contextual awareness for mobile applications.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
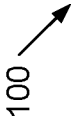
FIG. 1 is a block diagram of an exemplary network architecture in which embodiments of the present disclosure may operation.

Aspects of the present disclosure are directed to intelligent data storage for efficient retrieval from a memory sub-system based on contextual awareness for mobile applications. A memory sub-system can be a storage device, a memory module, or a hybrid of a storage device and memory module. Examples of storage devices and memory modules are described below in conjunction with FIG. 2. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. For example, NAND memory, such as 3D flash NAND memory, offers storage in the form of compact, high density configurations. A non-volatile memory device is a package of one or more dice, each including one or more planes. For some types of non-volatile memory devices (e.g., NAND memory), each plane includes of a set of physical blocks. Each block includes of a set of pages. Each page includes of a set of memory cells ("cells"). A cell is an electronic circuit that stores information. Depending on the cell type, a cell can store one or more bits of binary information, and has various logic states that correlate to the number of bits being stored. The logic states can be represented by binary values, such as "0" and "1", or combinations of such values.

A memory device can be made up of bits arranged in a two-dimensional or a three-dimensional grid. Memory cells are formed onto a silicon wafer in an array of columns (also hereinafter referred to as bitlines) and rows (also hereinafter referred to as wordlines). A wordline can refer to one or more rows of memory cells of a memory device that are used with one or more bitlines to generate the address of each of the memory cells. The intersection of a bitline and wordline constitutes the address of the memory cell. A block hereinafter refers to a unit of the memory device used to store data and can include a group of memory cells, a wordline group, a wordline, or individual memory cells. One or more blocks can be grouped together to form separate partitions (e.g., planes) of the memory device in order to allow concurrent operations to take place on each plane.

One example of a memory sub-system is a solid-state drive (SSD) that includes one or more non-volatile memory devices and a memory sub-system controller to manage the non-volatile memory devices. Depending on the implementation, the memory sub-system can be part of a larger storage hierarchy including multiple different memory devices, potentially of multiple different types. For example, a certain storage hierarchy could include certain memory that is remotely accessible and has a high storage capacity that, while relatively cheap, is also relatively slow. Such a hierarchy could further include local memory with a lower storage capacity that is more expensive, but also much faster. A memory sub-system controller or other logic can be tasked with deciding where in the hierarchy certain data items are to be stored, and can be responsible for moving data items around within the hierarchy as the needs of a host system or user change.

The data items stored at the memory sub-system and/or memory hierarchy can include a variety of items, such as images, videos, documents, etc. Conventional systems may attempt to categorize the data items based on the content to which they are directed or with which they are associated. Subsequently, in response to a search request or other query, those data items can be retrieved from corresponding storage locations and returned to the requestor. Virtual reality (VR) or augmented reality (AR) applications, for example, might have certain metadata that can be stored at the memory sub-system, since such applications have control over what a user sees and hears. The AR/VR applications can categorize data based on that additional metadata as temporal, spatial, or interacting information, for example, related to video, pictures, or the experience. Such conventional systems, however, do not co-locate or otherwise consider the storage locations of different data items in the same category. For example, different data items in the same category can be stored at different physical locations, such as at different levels of the storage hierarchy. Even data items that are stored in the same level of the storage hierarchy can be at different physical locations, such as in memory cells of different blocks, sub-blocks, or wordlines of a certain memory device. Accordingly, retrieval of such data items in a given category can take longer than if such data items were co-located, leading to increased latency, a lower quality of service, and unnecessary use of processing resources which cannot be utilized for other operations. In addition, when data items are associated with multiple categories, there can be conflicts between which categories should be prioritized with respect to one another, especially as a user's interests, preferences, and inclinations change over time.

Aspects of the present disclosure address the above and other issues by implementing intelligent data storage for efficient retrieval from a memory sub-system based on contextual awareness for mobile applications. In one embodiment, processing logic can categorize data items to be stored and co-locate different data items associated the same categories within the memory sub-system. For example, the processing logic can maintain a hierarchy of tags associated with the data items that can be dynamically updated accordingly to a contextual awareness of a user's preferences. When new data items (e.g., images, videos, documents, etc.) are received, the processing logic can utilize a machine learning model to identify certain tags to be associated with the data items. If a tag hierarchy (e.g., an ordered ranking of tags based on priority) already exists, the processing logic can identify a highest ranked tag associated with a given data item in the hierarchy, and can store that data item at a storage location along with other data items also associated that same highest ranked tag. In one embodiment, the processing logic can further monitor user activities, such as a search or web browsing history, application usage, messaging history, device location, etc., and dynamically update the tag hierarchy in view of those user activities. For example, at certain times or locations, different tags may be elevated in the hierarchy to indicate that the user is more likely to retrieve the data items associated with those tags. When a particular data item is no longer stored along with other data items associated with its highest ranked tag in the hierarchy, the processing logic can move the data item to different storage location so that the data item is stored with the other data items associated with its highest ranked tag. In this manner, if/when a request for the data items associated with that tag is received, the processing logic can retrieve all of those data items together from the same physical location (e.g., the same level of a storage hierarchy or the same segment of a certain memory device).

Advantages of the approaches described herein include, but are not limited to, improved performance in the memory sub-system. When multiple data items associated with a given category are co-located, they can be retrieved in response to a request or query with significantly lower latency. This can result in a higher quality of service experienced by the host system and the user, and a decreased use processing resources associated with servicing the request. In addition, dynamically updating the tag hierarchy can account for changes to user's interests, preferences, and inclinations, and can resolve any conflicts between which tags should be prioritized with respect to one another.

FIG. 1 is a block diagram of an exemplary network architecture 100, in which embodiments of the present disclosure may operate. In one embodiment, the network architecture 100 includes one or more host systems, such as mobile device 120A and server 120B. The host systems may communicate with each other and/or with other devices in network architecture 100 via one or more networks 150. Mobile device 120A and server 120B are representative of any number of devices which may operate to store and access data in network architecture 100. In other embodiments, network architecture 100 can include any number of stationary or mobile computers such as desktop personal computers (PCs), servers, server farms, workstations, laptops, handheld computers, personal digital assistants (PDAs), smart phones, and so forth. It is noted that some systems may include only a single host system, connected directly or remotely, to a corresponding memory sub-system.

In alternative embodiments, the number and type of host systems and data storage devices is not limited to those shown in FIG. 1. At various times one or more devices may operate offline. In addition, during operation, individual device connection types may change as users connect, disconnect, and reconnect to network architecture 100. Further, the systems and methods described herein may be applied to directly attached computing systems or network attached computing systems and may include a host operating system configured to perform one or more aspects of the described methods. Numerous such alternatives are possible and are contemplated.

In one embodiment, network 150 may utilize a variety of techniques including wireless connections, direct local area network (LAN) connections, wide area network (WAN) connections such as the Internet, a router, storage area network, Ethernet, and others. Network 150 may comprise one or more LANs that may also be wireless. Network 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 150. The network 150 may interface with a set of communications protocols used for the Internet such as the Transmission Control Protocol (TCP) and the Internet Protocol (IP), or TCP/IP.

In one embodiment, host systems 120A and 120B may be associated with respective memory sub-systems 110A and 110B. Memory sub-systems 110A and 110B can be any combination of storage devices and processing logic, and can include, for example, solid-state drives (SSDs), flash memory, magnetic or optical disks, tape drives, RAID arrays, EEPROM devices, storage area networks, network-attached storage, and/or any other devices capable of storing data. Additional details of the memory sub-systems are provided below with respect to FIG. 2.

Referring again to FIG. 1, host 120A and 120B may each include one or more processing devices, each comprising one or more processor cores. Each processor core includes circuitry for executing instructions according to a predefined general-purpose instruction set. The processor cores may access cache memory sub-systems for data and computer program instructions. The cache sub-systems may be coupled to a memory hierarchy including, for example, random access memory (RAM) and non-volatile memory devices. The processing devices can be configured to execute instructions of one or more customer processes and an instance of tag logic 113. Although not illustrated in FIG. 1, an instance of tag logic 113 can execute on mobile device 120A, as well as on server 120B.

In one embodiment, a user of mobile device 120A may create, capture, receive, or identify data items to be stored.

These data items can include images, videos, documents, or any other data items. In one embodiment, the user can utilize a virtual reality (VR) or augmented reality (AR) headset 160 to create, capture, receive, or identify the data items. In one embodiment, the instance of tag logic 113 running locally on mobile device 120A or remotely on server 120B can categorize the data items to be stored and assign each data item one or more tags representative of the content of the data item. For example, tag logic 113 can provide the data items as inputs to a trained machine learning model and obtain an output of the trained machine learning model including the one or more tags. As described in more detail below, the trained machine learning models may be composed of a single level of linear or non-linear operations (e.g., a support vector machine [SVM]) or may be a deep network (i.e., a machine learning model that is composed of multiple levels of non-linear operations). The trained machine learning model may include, for example, a convolutional neural network, recurrent neural network with one or more hidden layers, or a fully connected neural network. In one embodiment, the trained machine learning model is trained using a training data set comprising examples of data items as a training input and one or more tags that correctly correspond to the content of the data items as a target output.

In one embodiment, upon identifying the one or more tags to be associated with the data items, the tag logic 113 can cause the data items to be stored together (i.e., in the same or nearby physical location) with other data items associated with the same one or more tags. For example, tag logic 113 can maintain a hierarchy of tags associated with the data items that can be dynamically updated accordingly to a contextual awareness of the user's preferences. If a tag hierarchy (e.g., an ordered ranking of tags based on priority) already exists, tag logic 113 can identify a highest ranked tag associated with a given data item in the hierarchy, and can store that data item at a storage location in one of memory sub-systems 110A or 110B along with other data items also associated that same highest ranked tag (i.e., as co-located data items 180). In one embodiment, tag logic 113 can further monitor user activities, such as a search or web browsing history, application usage, messaging history, device location, etc., and dynamically update the tag hierarchy in view of those user activities. For example, at certain times or locations, different tags may be elevated in the hierarchy to indicate that the user is more likely to retrieve the data items associated with those tags. When a particular data item is no longer stored along with other data items associated with its highest ranked tag in the hierarchy, tag logic can cause the data item to be moved to different storage location so that the data item is stored with the other data items associated with its highest ranked tag. In this manner, if/when a request for the data items associated with that tag is received, tag logic 113 can retrieve all of those data items together from the same physical location (e.g., the same level of a storage hierarchy or the same segment of a certain memory device in one of memory sub-system 110A or 110B). Additional details with respect to the operations of tag logic 113 are provided below.

Figure 2:
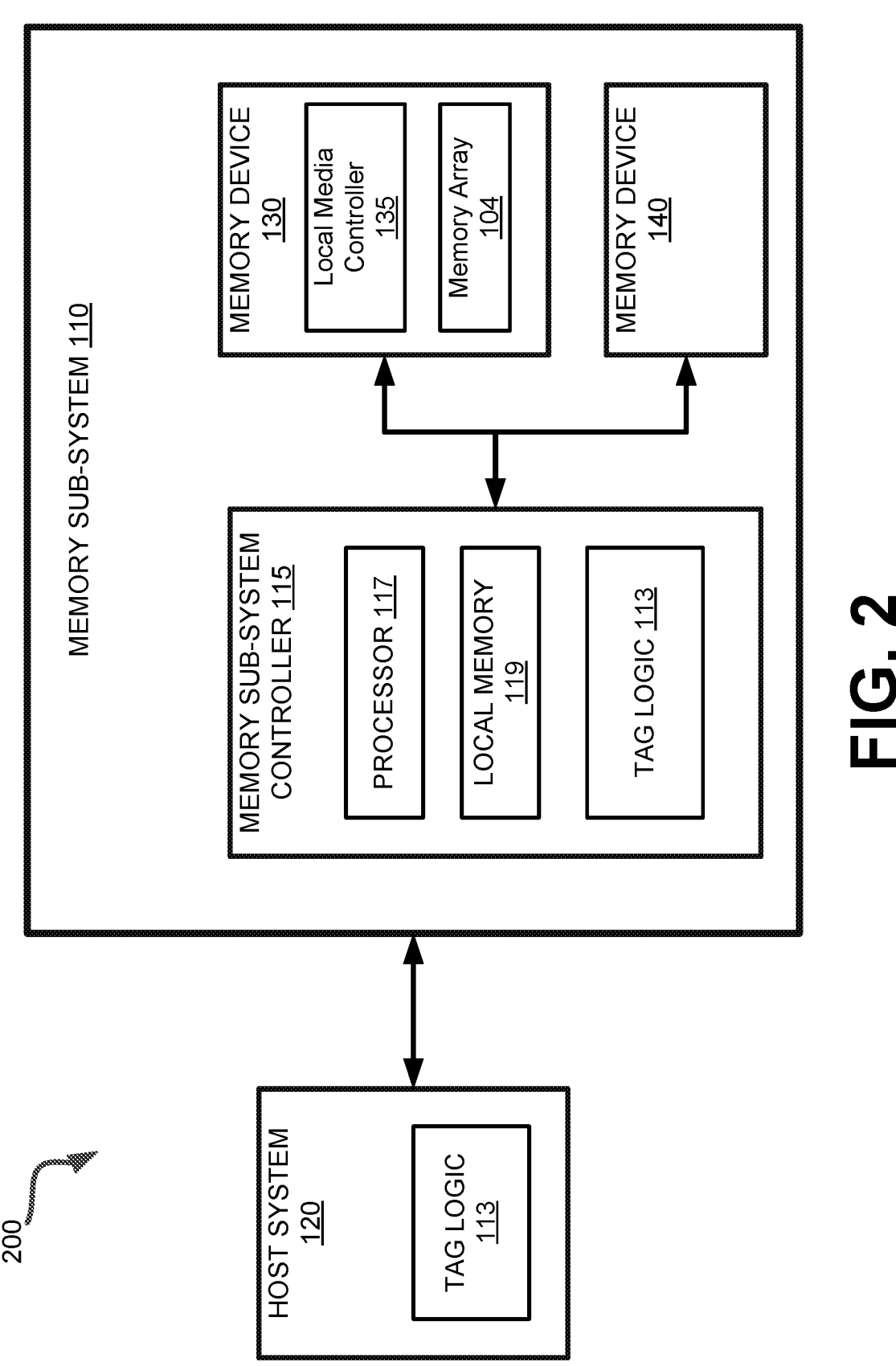
FIG. 2 illustrates an example computing system that includes a memory sub-system in accordance with some embodiments of the present disclosure.

FIG. 2 illustrates an example computing system 200 that includes a memory sub-system 110 in accordance with some embodiments of the present disclosure. The memory sub-system 110 can be representative of either memory sub-system 110A or 110B of FIG. 1, and can include media, such as one or more volatile memory devices (e.g., memory device 140), one or more non-volatile memory devices (e.g., one or more memory device(s) 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 200 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 200 can include a host system 120 that is coupled to one or more memory sub-systems 110. In some embodiments, the host system 120 is coupled to different types of memory sub-system 110. FIG. 2 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110. The host system 120 can be representative of either mobile device 120A or server 120B of FIG. 1.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access the memory components (e.g., the one or more memory device(s) 130) when the memory sub-system 110 is coupled with the host system 120 by the PCIe interface. The physical host interface can provide an interface for passing control, address, data, and other signals between the memory sub-system 110 and the host system 120. FIG. 2 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device(s) 130) include negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory device(s) 130 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, electrically erasable programmable read-only memory (EEPROM).

A memory sub-system controller 115 (or controller 115 for simplicity) can communicate with the memory device(s) 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can include a processor 117 (e.g., a processing device) configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 2 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory device(s) 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory device(s) 130. The memory sub-system controller 115 can further include host interface circuitry to communicate with the host system 120 via the physical host interface. The host interface circuitry can convert the commands received from the host system into command instructions to access the memory device(s) 130 as well as convert responses associated with the memory device(s) 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory device(s) 130.

In some embodiments, the memory device(s) 130 include local media controllers 135 that operate in conjunction with memory sub-system controller 115 to execute operations on one or more memory cells of the memory device(s) 130. An external controller (e.g., memory sub-system controller 115) can externally manage the memory device 130 (e.g., perform media management operations on the memory device(s) 130). In some embodiments, a memory device 130 is a managed memory device, which is a raw memory device (e.g., memory array 104) having control logic (e.g., local controller 135) for media management within the same memory device package. An example of a managed memory device is a managed NAND (MNAND) device. Memory device(s) 130, for example, can each represent a single die having some control logic (e.g., local media controller 135) embodied thereon. In some embodiments, one or more components of memory sub-system 110 can be omitted.

In one embodiment, the host system 120 includes an instance of tag logic 113. In other embodiments, tag logic 113 can be executed by memory sub-system controller 115 instead. As described herein, tag logic 113 can facilitate intelligent data storage for efficient retrieval from memory sub-system 110 based on contextual awareness, such as from mobile device 120A. For example, tag logic 113 can monitor user activities, such as a search or web browsing history, application usage, messaging history, device location, etc., and use that contextual information to develop and maintain a hierarchy of tags associated with data items to be stored at memory sub-system 110. In one embodiment, tag logic 113 can categorize data items to be stored and co-locate different data items associated the same categories within the memory sub-system 110, such that if/when a request for the data items associated with a given tag is received, all of the data items associated with that tag can be retrieved together from the same physical location (e.g., the same level of a storage hierarchy or the same segment of a certain memory device, such as memory device 130). Tag logic can dynamically update the tag hierarchy in view of changing contextual awareness and can correspondingly relocate data items with memory sub-system 110 as appropriate. Further details with regards to the operations of tag logic 113 are described below.

Figure 3:
FIG. 3 is a flow diagram of an example method of intelligent data storage based on contextual awareness in accordance with some embodiments of the present disclosure.
Figure 3:
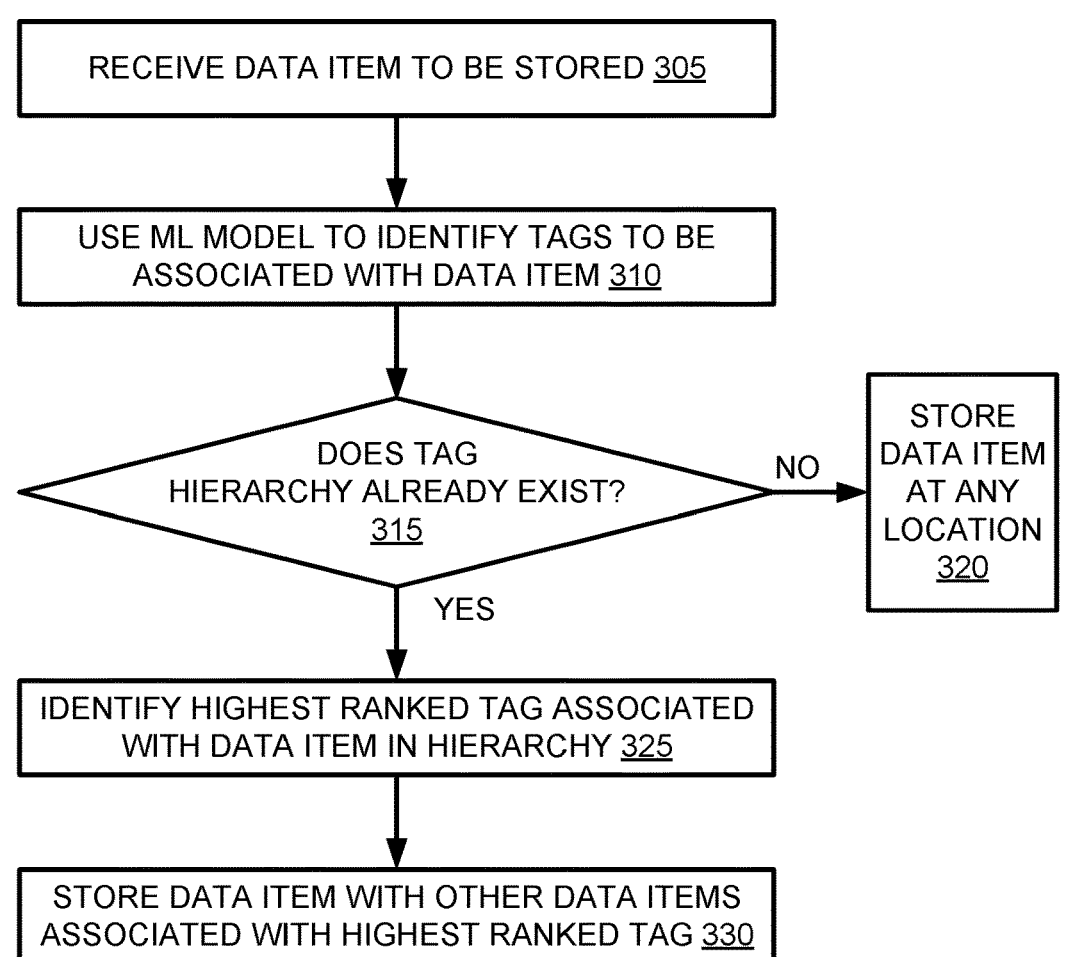

FIG. 3 is a flow diagram of an example method of intelligent data storage based on contextual awareness in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by tag logic 113 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 305, the processing logic (e.g., tag logic 113) receives a data item to be stored at a memory device. Depending on the embodiment, the data item, such as data item 410 of FIG. 4, can include, for example, an image, video, document, or other data item. In one embodiment, the data item 410 is captured, created, generated, or identified, for example, by mobile device 120A. For example, a user of mobile device 120A could take a photograph using a camera of the mobile device 120A, or could draft a document using an application on the mobile device 120A. In another embodiment, a video, for example, could be downloaded to mobile device 120A (e.g., over network 150). Tag logic 113 can receive a request to store the data item 410 at a memory device. In one embodiment, tag logic 113 has access to a multi-tier memory hierarchy where the data item can be stored. For example, the tag logic 113 executing on mobile device 120A can access local memory sub-system 110A which can include volatile memory (e.g., memory device 140) and non-volatile memory (e.g., memory device 130) and can further access remote memory sub-system 110B (e.g., via network 150). Each of these memory devices can represent a different tier of the multi-tier memory hierarchy, and tag logic 113 can identify an appropriate tier at which to store the received data item 410.

At operation 310, the processing logic uses a trained machine learning model to identify one or more tags to be associated with the data item. In one embodiment, tag logic 113 optionally generates a feature matrix representing at least a portion of the data item, for example by performing a number of processing operations on the data item to extract a number of features for input into the trained machine learning model. In one embodiment, tag logic 113 provides the data item 410 itself and/or the generated feature matrix as an input to the trained machine learning model, such as trained machine learning (ML) model 420 of FIG. 4. In one embodiment, the trained machine learning model 420 may be composed of a single level of linear or non-linear operations, such as an SVM or deep network (i.e., a machine learning model that is composed of multiple levels of non-linear operations), such as a convolutional neural network. In one embodiment, the convolutional neural network is trained using a training data set formed from examples of data items as a training input and one or more content identifiers that correctly correspond to the content of the data items as a target output. The training may result in an optimal topology of the network. Tag logic 113 can further obtain an output of the trained machine learning model, wherein the output comprises an indication of the one or more tags 430 representing the content of the data item 410. For example, if the data item 410 is a photograph of an individual "John" skiing in the mountains during the winter holidays, the trained machine learning model can identify this content and identify a set of tags 430 including, for example: [John, skiing, mountains, holidays].

At operation 315, the processing logic determines whether a data item tag hierarchy already exists. In one embodiment, tag logic 113 can maintain the data item tag hierarchy in view of user context information. The data item tag hierarchy, such as tag hierarchy 440 of FIG. 4, can include a ranked list of data item tags arranged in order of priority. For example, a data item associated with a higher ranked data item tag in the data item tag hierarchy is more likely to be requested than a data item associated with a lower ranked data item tag in the data item tag hierarchy. Tag logic 113 can use the user context information to generate and dynamically update the ranked list of data item tags. For example, in response to a change in at least one of a user's search history, application usage, messaging history, device location, preferences, user profile, date, etc., tag logic can arrange or rearrange the order of the tags in the ranked list. In one embodiment, a given data item tag is given a higher priority (i.e., a higher ranking) if the user context information indicates that data items associated with that data item tag are more likely to be requested (i.e., retrieved from storage). For example, if it is the winter holiday season, the tag "holidays" may be given a higher priority. Similarly, if the user has recently done a web search for ski resorts, the tag "skiing" may be given a higher priority, or if the user has recently received a message from John, the tag "John" may be given a higher priority. Tag logic 113 can balance all of this context information to determine the order of priority for the ranked list of data item tags.

If a data item tag hierarchy does not exist, at operation 320, the processing logic stores the data item at any location in the memory hierarchy. If, however, a data item tag hierarchy 440 does exist, at operation 325, the processing logic identifies, from the data item tag hierarchy 440, the highest ranked tag of those tags associated with the data item. In one embodiment, the highest ranked tag is the tag with the highest priority among the other tags associated with the data item. For example, if the tags associated with the data item are [John, skiing, mountains, holidays], as noted above, and those tags are ranked in the hierarchy (e.g., in the order from highest priority to lowest priority) as: 1. holidays, 2., John, 3. mountains, 4. skiing, tag logic 113 can identify "holidays" as the highest ranked tag. It should be noted that the data item tag hierarchy 440 may include other data item tags ranked higher than, lower than, or in-between the tags associated with the data item (i.e., such that the tag "holidays" is not necessarily the highest ranking tag in the ranked list overall).

At operation 330, the processing logic stores the data item at a first shared storage location together with one or more additional data items with which the highest ranked tag is also associated. For example, since it was determined that "holidays" was the highest ranked tag, tag logic can store the data item at the first shared storage location along with other data items with which the tag "holidays" is also associated. Soring 480 the data item at the first shared storage location, such as first storage location 450 of FIG. 4, can include storing all of the data items with which the tag "holidays" is associated in a same tier of the multi-tier memory hierarchy. For example, if the lowest tier of the memory hierarchy is the remote storage of memory sub-system 110B, the middle tier is the non-volatile memory device 130 of the local memory sub-system 110A, and the highest tier is the volatile memory device 140 of the local memory sub-system 110A, tag logic 113 can cause the data item to be stored on memory device 140 of the local memory sub-system 110A along with the other data items with which the tag "holidays" is associated. In other embodiments, the first shared storage location 450 can be at some other tier of the multi-tier memory hierarchy.

Figure 5:
FIG. 5 is a flow diagram of an example method of intelligently relocating data items based on a dynamically updated tag hierarchy in accordance with some embodiments of the present disclosure.
Figure 5:
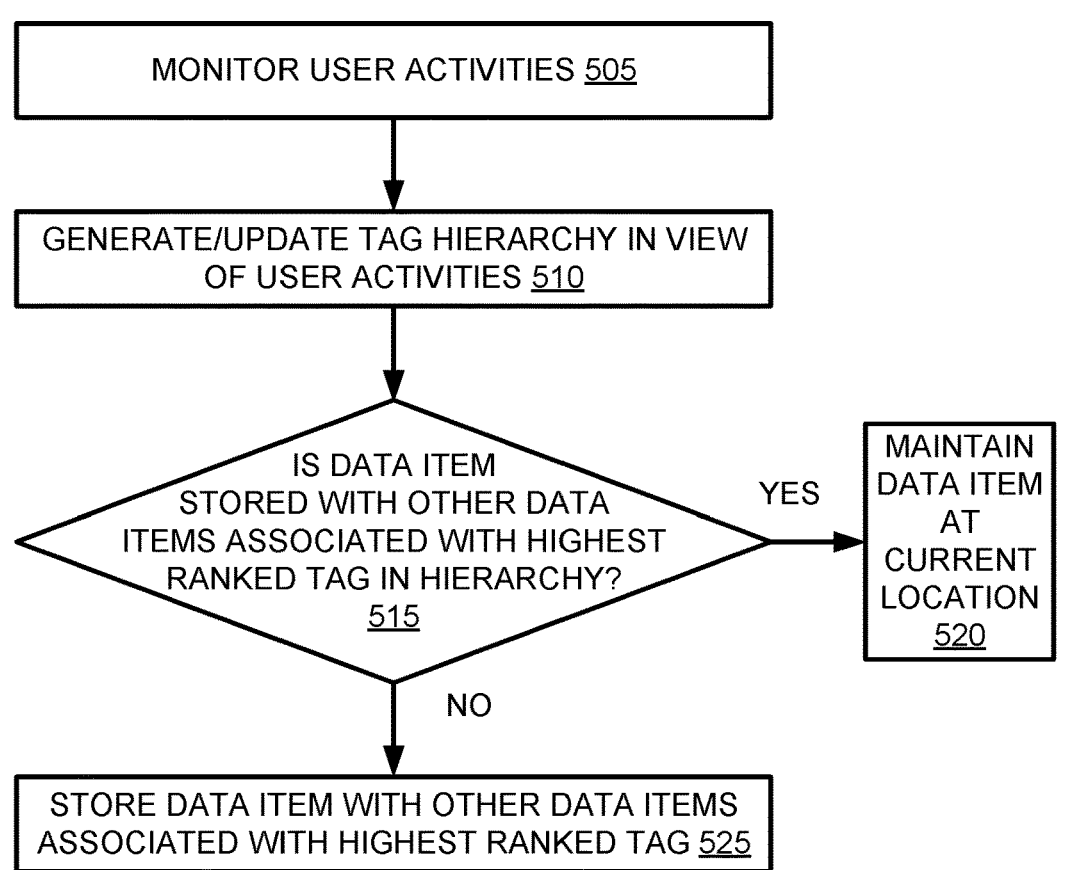

FIG. 5 is a flow diagram of an example method of intelligently relocating data items based on a dynamically updated tag hierarchy in accordance with some embodiments of the present disclosure. The method 300 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by tag logic 113 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 505, the processing logic (e.g., tag logic 113) monitors user activities, such as those of a user of mobile device 120A. The user activities can be representative of user context information, and tag logic 113 can look for changes to a user's search history, application usage, messaging history, device location, preferences, date, or user profile, for example.

At operation 510, the processing logic can generate and/or update a data item tag hierarchy, such as tag hierarchy 440, in response to the change. For example, tag logic 113 can arrange or rearrange the order of the tags in the ranked list. In one embodiment, a given data item tag is given a higher priority (i.e., a higher ranking) if the user context information indicates that data items associated with that data item tag are more likely to be requested (i.e., retrieved from storage). For example, if it is the winter holiday season, the tag "holidays" may be given a higher priority. Similarly, if the user has recently done a web search for ski resorts, the tag "skiing" may be given a higher priority, or if the user has recently received a message from John, the tag "John" may be given a higher priority. Tag logic 113 can balance all of this context information to determine the order of priority for the ranked list of data item tags. The result can be an updated tag hierarchy 460, as shown in FIG. 4, having a change in the order of priority of the data item tags in the ranked list.

Figure 4:
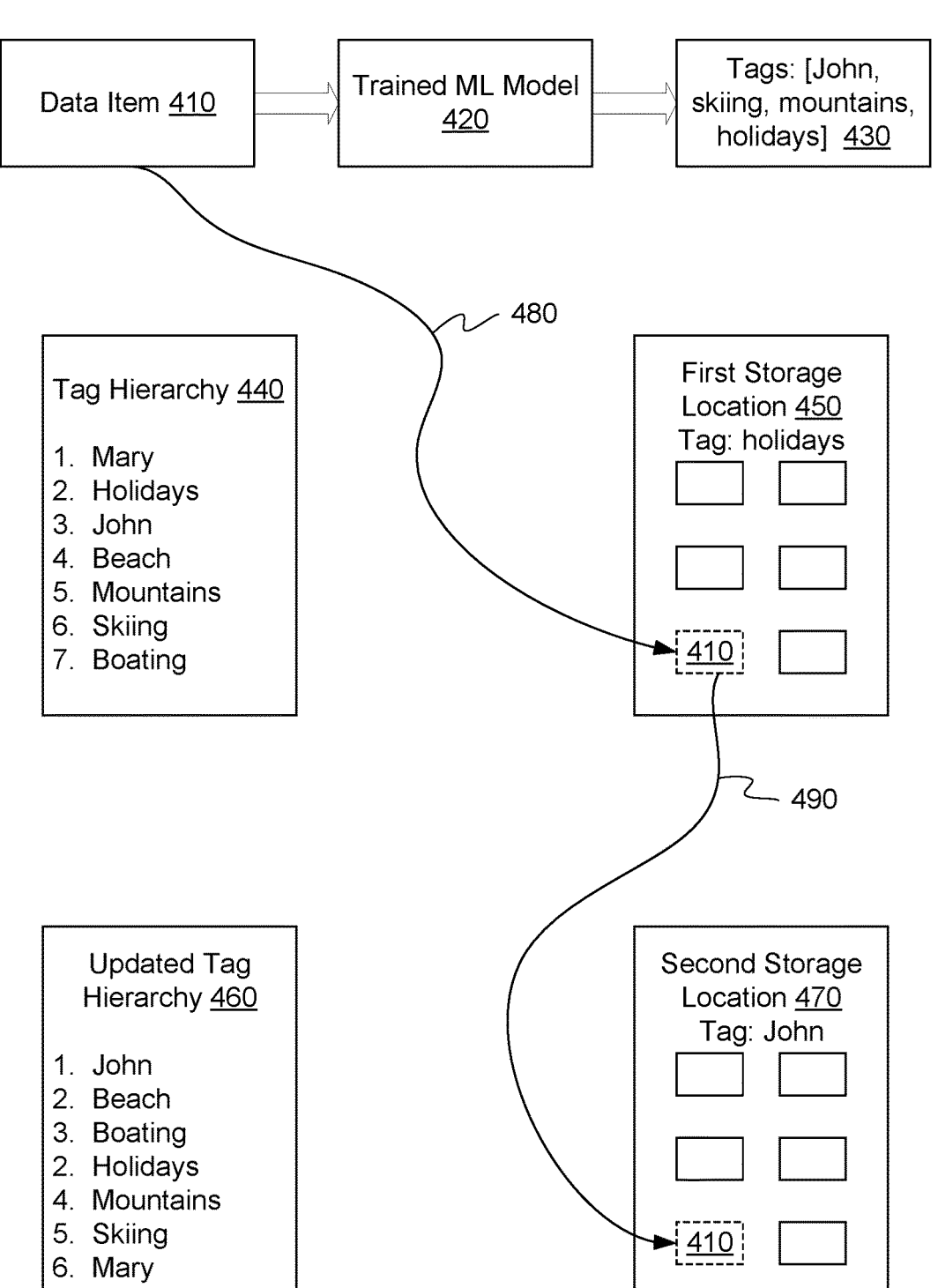
FIG. 4 is a block diagram illustrating intelligent data storage based on contextual awareness in accordance with some embodiments of the present disclosure.

Response to detecting an update to the data item tag hierarchy, at operation 515, the processing logic identifies an updated highest ranked data item tag associated with a given data item, such as data item 410, and determines whether the data item 410 is stored at a second shared storage, such as second storage location 470 of FIG. 4, location together with one or more additional data items with which the updated highest rank data item tag is also associated. In one embodiment, the updated highest ranked tag is the data item tag with the highest priority in the updated tag hierarchy 460 among the other tags associated with the data item 410. For example, if the tags associated with the data item are [John, skiing, mountains, holidays], as noted above, and those tags are ranked in the updated tag hierarchy 460 (e.g., in the order from highest priority to lowest priority) as: 1. John, 2. holidays, 3. mountains, 4. skiing, tag logic 113 can identify "John" as the updated highest ranked tag. If the data item 410 is already stored with the other data items with which the tag "John" is associated, at operation 520, the processing logic can maintain the data item 410 at that location. In another embodiment, however, tag logic 113 can determine that the data item 410 is currently stored at the first storage location 450 with the other data items with which the tag "holidays" is associated.

Responsive to determining that the data item 410 is not stored at the second shared storage location 470, at operation 525, the processing logic stores the data item 410 at the second shared storage location 470 together with the one or more additional data items with which the updated highest ranked data item tag (i.e., "John") is also associated. Soring 490 the data item at the second shared storage location 470 can include storing all of the data items with which the tag "John" is associated in a same tier of the multi-tier memory hierarchy. For example, if the lowest tier of the memory hierarchy is the remote storage of memory sub-system 110B, the middle tier is the non-volatile memory device 130 of the local memory sub-system 110A, and the highest tier is the volatile memory device 140 of the local memory sub-system 110A, tag logic 113 can cause the data item to be stored on memory device 140 of the local memory sub-system 110A along with the other data items with which the tag "John" is associated. In other embodiments, the second shared storage location 470 can be at some other tier of the multi-tier memory hierarchy. In one embodiment, the other data items with which the tag "John" is associated can already be present at the second shared storage location 470. In another embodiment, however, those other data items are distributed throughout the memory hierarchy, and tag logic 113 can bring those data items together to the second shared storage location 470 as part of operation 525.

Once the data item 410 is stored together with other data items with which it shares a highest ranked data item tag, those data items are available for retrieval. For example, tag logic 113 may subsequently receive a request for a particular data item from the memory hierarchy. This request may be triggered, for example, by a user query for all of the data items associated with a certain keyword or data item tag. Since all of the data items associated with the highest priority data item tags are co-located within the memory hierarchy, those data items can be retrieved with much lower latency than if they were distributed throughout the memory hierarchy. For example, if the user requests all of the photographs of the individual "John," tag logic can retrieve those data items quickly and efficiently from the second shared storage location 470 and return them to the user.

Figure 6:
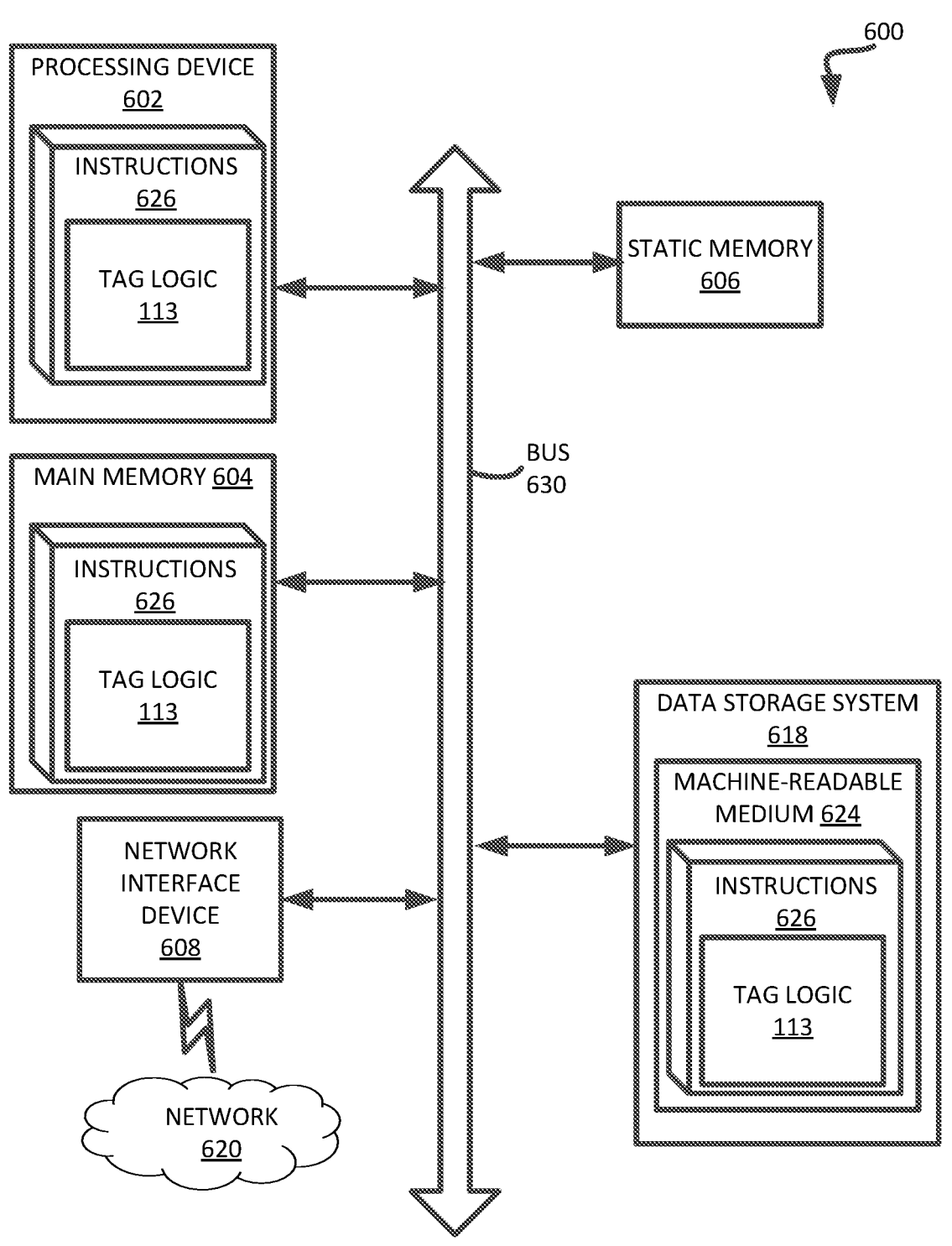
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 2) that includes, is coupled to, or utilizes a memory sub-system (e.g., the memory sub-system 110 of FIG. 2) or can be used to perform the operations of a controller (e.g., to execute an operating system to perform operations corresponding to the tag logic 113 of FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a data storage system 618, which communicate with each other via a bus 630.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 2.

In one embodiment, the instructions 626 include instructions to implement functionality corresponding to the tag logic 113 of FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
a memory device; and
a processing device, operatively coupled with the memory device, to perform operations comprising:
  maintaining a data item tag hierarchy in view of user context information;
  identifying, from the data item tag hierarchy, a highest ranked data item tag of a plurality of data item tags associated with a data item, the plurality of data item tags representing a content of the data item; and
  storing the data item on the memory device at a first shared storage location together with one or more additional data items with which the highest ranked data item tag is also associated, wherein the memory device is part of a multi-tier memory hierarchy comprising a remote storage tier, a local non-volatile memory tier, and a local volatile memory tier, and wherein storing the data item on the memory device comprises physically co-locating the data item and the one or more additional data items together in a same tier of the multi-tier memory hierarchy based on the data item and the one or more additional data items sharing the highest ranked data item tag, such that all data items associated with the highest ranked data item tag are physically stored together in memory cells of at least one of a block, sub-block, or wordline of the memory device in the same one of the remote storage tier, the local non-volatile memory tier, or the local volatile memory tier to enable retrieval of the data item and the one or more additional data items together.

2. The system of claim 1, wherein the data item tag hierarchy comprises ranked list of data item tags arranged in order of priority, wherein a data item associated with a higher ranked data item tag in the data item tag hierarchy is more likely to be requested than a data item associated with a lower ranked data item tag in the data item tag hierarchy.

3. The system of claim 2, wherein maintaining the data item tag hierarchy in view of user context information comprises dynamically updating the ranked list of data item tags in response to a change in at least one of a user's search history, application usage, messaging history, device location, preferences, date, or user profile.

4. The system of claim 3, wherein the processing device is to perform operations further comprising:
  detecting an update to the data item tag hierarchy, the update resulting in an updated data item tag hierarchy comprising a change in the order of priority of the data item tags in the ranked list;
  identifying, from the updated data item tag hierarchy, an updated highest ranked data item tag of the plurality of data item tags associated with the data item;
  determining that the data item is not stored at a second shared storage location together with one or more additional data items with which the updated highest ranked data item tag is also associated; and
  storing the data item on the memory device at the second shared storage location together with the one or more additional data items with which the updated highest ranked data item tag is also associated.

5. The system of claim 2, wherein the data item comprises metadata associated with at least one of a virtual reality (VR) or augmented reality (AR) application.

6. The system of claim 1, wherein the processing device is to perform operations further comprising:
  receiving the data item to be stored at the memory device;
  providing the data item at an input to a trained machine learning model; and
  obtaining an output of the trained machine learning model, wherein the output comprises an indication of the plurality of data item tags representing the content of the data item.

7. A method comprising:
maintaining a data item tag hierarchy in view of user context information;
identifying, from the data item tag hierarchy, a highest ranked data item tag of a plurality of data item tags associated with a data item, the plurality of data item tags representing a content of the data item; and
storing the data item on a memory device at a first shared storage location together with one or more additional data items with which the highest ranked data item tag is also associated, wherein the memory device is part of a multi-tier memory hierarchy comprising a remote storage tier, a local non-volatile memory tier, and a local volatile memory tier, and wherein storing the data item on the memory device comprises physically co-locating the data item and the one or more additional data items together in a same tier of the multi-tier memory hierarchy based on the data item and the one or more additional data items sharing the highest ranked data item tag, such that all data items associated with the highest ranked data item tag are physically stored together in memory cells of at least one of a block, sub-block, or wordline of a memory device in the same one of the remote storage tier, the local non-volatile memory tier, or the local volatile memory tier to enable retrieval of the data item and the one or more additional data items together.

8. The method of claim 7, wherein the data item tag hierarchy comprises ranked list of data item tags arranged in order of priority, wherein a data item associated with a higher ranked data item tag in the data item tag hierarchy is more likely to be requested than a data item associated with a lower ranked data item tag in the data item tag hierarchy.

9. The method of claim 8, wherein maintaining the data item tag hierarchy in view of user context information comprises dynamically updating the ranked list of data item tags in response to a change in at least one of a user's search history, application usage, messaging history, device location, preferences, date, or user profile.

10. The method of claim 9, further comprising:

detecting an update to the data item tag hierarchy, the update resulting in an updated data item tag hierarchy comprising a change in the order of priority of the data item tags in the ranked list;

identifying, from the updated data item tag hierarchy, an updated highest ranked data item tag of the plurality of data item tags associated with the data item;

determining that the data item is not stored at a second shared storage location together with one or more additional data items with which the updated highest ranked data item tag is also associated; and storing the data item on the memory device at the second shared storage location together with the one or more additional data items with which the updated highest ranked data item tag is also associated.

11. The method of claim 8, wherein the data item comprises metadata associated with at least one of a virtual reality (VR) or augmented reality (AR) application.

12. The method of claim 7, further comprising:

receiving the data item to be stored at the memory device;

providing the data item at an input to a trained machine learning model; and obtaining an output of the trained machine learning model, wherein the output comprises an indication of the plurality of data item tags representing the content of the data item.

13. A non-transitory computer-readable storage medium comprising instructions that, when executed by a processing device, cause the processing device to perform operations comprising:

maintaining a data item tag hierarchy in view of user context information;

identifying, from the data item tag hierarchy, a highest ranked data item tag of a plurality of data item tags associated with a data item, the plurality of data item tags representing a content of the data item; and storing the data item on a memory device at a first shared storage location together with one or more additional data items with which the highest ranked data item tag is also associated, wherein the memory device is part of a multi-tier memory hierarchy comprising a remote storage tier, a local non-volatile memory tier, and a local volatile memory tier, and wherein storing the data item on the memory device comprises physically co-locating the data item and the one or more additional data items together in a same tier of the multi-tier memory hierarchy based on the data item and the one or more additional data items sharing the highest ranked data item tag, such that all data items associated with the highest ranked data item tag are physically stored together in memory cells of at least one of a block, sub-block, or wordline of a memory device in the same one of the remote storage tier, the local non-volatile memory tier, or the local volatile memory tier to enable retrieval of the data item and the one or more additional data items together.

14. The non-transitory computer-readable storage medium of claim 13, wherein the data item tag hierarchy comprises ranked list of data item tags arranged in order of priority, wherein a data item associated with a higher ranked data item tag in the data item tag hierarchy is more likely to be requested than a data item associated with a lower ranked data item tag in the data item tag hierarchy.

15. The non-transitory computer-readable storage medium of claim 14, wherein maintaining the data item tag hierarchy in view of user context information comprises dynamically updating the ranked list of data item tags in response to a change in at least one of a user's search history, application usage, messaging history, device location, preferences, date, or user profile.

16. The non-transitory computer-readable storage medium of claim 15, wherein the instructions cause the processing device to perform operations further comprising:

detecting an update to the data item tag hierarchy, the update resulting in an updated data item tag hierarchy comprising a change in the order of priority of the data item tags in the ranked list;

identifying, from the updated data item tag hierarchy, an updated highest ranked data item tag of the plurality of data item tags associated with the data item;

determining that the data item is not stored at a second shared storage location together with one or more additional data items with which the updated highest ranked data item tag is also associated; and storing the data item on the memory device at the second shared storage location together with the one or more additional data items with which the updated highest ranked data item tag is also associated.

17. The non-transitory computer-readable storage medium of claim 13, wherein the instructions cause the processing device to perform operations further comprising:

receiving the data item to be stored at the memory device;

providing the data item at an input to a trained machine learning model; and obtaining an output of the trained machine learning model, wherein the output comprises an indication of the plurality of data item tags representing the content of the data item.

\* \* \* \* \*